United States Patent
Wylezinski

(10) Patent No.: US 12,539,802 B2
(45) Date of Patent: Feb. 3, 2026

(54) EMBEDDED MOUNTING INSERTS

(71) Applicant: Wabash National, L.P., Lafayette, IN (US)

(72) Inventor: Andrzej Wylezinski, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 468 days.

(21) Appl. No.: 17/989,606

(22) Filed: Nov. 17, 2022

(65) Prior Publication Data

US 2023/0173972 A1      Jun. 8, 2023

Related U.S. Application Data

(60) Provisional application No. 63/286,657, filed on Dec. 7, 2021.

(51) Int. Cl.
*B60P 3/20*      (2006.01)
*B60P 7/08*      (2006.01)
*F25D 19/00*      (2006.01)

(52) U.S. Cl.
CPC ............. *B60P 3/20* (2013.01); *B60P 7/0807* (2013.01); *F25D 19/003* (2013.01)

(58) Field of Classification Search
CPC ......... B60P 3/20; B60P 7/0807; F25D 19/003
USPC ......... 296/24.35, 181.6, 181.7, 184.1, 182.1, 296/185.1, 186.1, 186.3, 181.3; 411/176; 428/99
See application file for complete search history.

(56) References Cited

U.S. PATENT DOCUMENTS

| | | |
|---|---|---|
| 1,552,585 A | 9/1925 | Synck |
| 2,478,993 A | 8/1949 | Wing |
| 3,132,604 A | 5/1964 | Tappan et al. |
| 3,367,992 A | 2/1968 | Bearden |
| 3,557,992 A | 1/1971 | Reeves |
| 3,598,412 A | 8/1971 | Lippert |
| 3,637,252 A | 1/1972 | Metsker |
| 3,705,732 A | 12/1972 | Marinelli |
| 3,857,752 A | 12/1974 | McCoy |

(Continued)

FOREIGN PATENT DOCUMENTS

| | | |
|---|---|---|
| AU | 07132/60 B2 | 11/1999 |
| CA | 1329818 C | 5/1994 |

(Continued)

OTHER PUBLICATIONS

"A Study of the Reaction Kinetics of Polyisocyanurate Foam Formulations using Real-time FTIR" Romero et al., J Cellular Plastics, 41:339-59 (2005).

(Continued)

*Primary Examiner* — Amy R Weisberg
*Assistant Examiner* — Veronica M Condo
(74) *Attorney, Agent, or Firm* — Faegre Drinker Biddle & Reath LLP

(57) ABSTRACT

The present disclosure provides an embedded mounting assembly for mounting a large component (e.g., a refrigeration unit) to a cargo vehicle. The mounting assembly includes a mounting insert embedded within a wall of the cargo vehicle to support the loading of the large component while providing for cost-effective manufacturing and installation without reduction of structural integrity and safety.

25 Claims, 9 Drawing Sheets

(56) References Cited

U.S. PATENT DOCUMENTS

| | | |
|---|---|---|
| 3,910,624 A | 10/1975 | Becker |
| 3,996,307 A | 12/1976 | Najvar et al. |
| 4,049,285 A | 9/1977 | Chieger |
| 4,197,390 A | 4/1980 | Jackson |
| 4,239,276 A | 12/1980 | Bertolini |
| 4,280,979 A | 7/1981 | Dunleavy et al. |
| 4,296,220 A | 10/1981 | Seeburger et al. |
| 4,302,553 A | 11/1981 | Frisch et al. |
| 4,399,642 A | 8/1983 | Bard et al. |
| 4,409,274 A | 10/1983 | Chaplin et al. |
| 4,418,507 A | 12/1983 | Roberts et al. |
| 4,421,827 A | 12/1983 | Phillips |
| 4,498,264 A | 2/1985 | McCafferty et al. |
| 4,685,720 A | 8/1987 | Oren et al. |
| 4,758,299 A | 7/1988 | Burke |
| 4,822,849 A | 4/1989 | Vanderlaan |
| 4,892,919 A | 1/1990 | Leitheiser et al. |
| 4,921,658 A | 5/1990 | Pennington et al. |
| 4,923,934 A | 5/1990 | Werner |
| 4,951,992 A | 8/1990 | Hockney |
| 4,976,490 A | 12/1990 | Gentle |
| 4,997,705 A | 3/1991 | Caprette et al. |
| 5,096,640 A | 3/1992 | Brody et al. |
| 5,143,418 A | 9/1992 | Fouquet |
| 5,153,261 A | 10/1992 | Brooks |
| 5,159,044 A | 10/1992 | Bogner |
| 5,281,634 A | 1/1994 | Hesse et al. |
| 5,296,544 A | 3/1994 | Heise et al. |
| 5,296,545 A | 3/1994 | Heise |
| 5,302,634 A | 4/1994 | Mushovic |
| 5,344,852 A | 9/1994 | Brooks et al. |
| 5,346,233 A | 9/1994 | Moser |
| 5,369,147 A | 11/1994 | Mushovic |
| 5,382,626 A | 1/1995 | Credali et al. |
| 5,403,063 A | 4/1995 | Sjostedt et al. |
| 5,429,066 A | 7/1995 | Lewit et al. |
| 5,464,919 A | 11/1995 | Sinclair |
| 5,501,504 A | 3/1996 | Kunz |
| 5,507,405 A | 4/1996 | Thomas et al. |
| 5,508,315 A | 4/1996 | Mushovic |
| 5,509,714 A | 4/1996 | Schmidt |
| 5,562,981 A | 10/1996 | Ehrlich |
| 5,588,693 A | 12/1996 | Higginson et al. |
| 5,589,243 A | 12/1996 | Day |
| 5,604,266 A | 2/1997 | Mushovic |
| 5,664,518 A | 9/1997 | Lewit et al. |
| 5,700,118 A * | 12/1997 | Bennett ................ B60P 3/20 296/181.6 |
| 5,756,600 A | 5/1998 | Okumura et al. |
| 5,765,639 A | 6/1998 | Muth |
| 5,772,276 A | 6/1998 | Fetz et al. |
| 5,800,749 A | 9/1998 | Lewit et al. |
| 5,802,984 A | 9/1998 | Thoman et al. |
| 5,821,296 A | 10/1998 | Borden |
| 5,830,308 A | 11/1998 | Reichard |
| 5,860,668 A | 1/1999 | Hull et al. |
| 5,860,693 A | 1/1999 | Ehrlich |
| 5,872,196 A | 2/1999 | Murata et al. |
| 5,890,435 A | 4/1999 | Thoman et al. |
| 5,897,818 A | 4/1999 | Lewit et al. |
| 5,908,591 A | 6/1999 | Lewit et al. |
| 5,916,093 A | 6/1999 | Fecko et al. |
| 5,919,844 A | 7/1999 | Shimizu et al. |
| 5,934,741 A | 8/1999 | Beukers et al. |
| 5,936,034 A | 8/1999 | Smith |
| 5,952,436 A | 9/1999 | Cai et al. |
| 5,979,684 A | 11/1999 | Ohnishi et al. |
| 5,992,117 A | 11/1999 | Schmidt |
| 6,004,492 A | 12/1999 | Lewit et al. |
| 6,007,894 A | 12/1999 | Barnes et al. |
| 6,013,213 A | 1/2000 | Lewit et al. |
| 6,076,693 A | 6/2000 | Reiter et al. |
| 6,082,810 A | 7/2000 | Bennett |
| 6,092,472 A | 7/2000 | Thoman et al. |
| 6,159,414 A | 12/2000 | Tunis et al. |
| 6,199,939 B1 | 3/2001 | Ehrlich |
| 6,206,669 B1 | 3/2001 | Lewit et al. |
| 6,211,259 B1 | 4/2001 | Borden et al. |
| 6,220,651 B1 | 4/2001 | Ehrlich |
| 6,227,125 B1 | 5/2001 | Schroeder et al. |
| 6,247,747 B1 | 6/2001 | Kawanomoto et al. |
| 6,283,538 B1 | 9/2001 | Reitnouer |
| 6,318,794 B1 | 11/2001 | Berube |
| 6,349,988 B1 | 2/2002 | Foster et al. |
| 6,374,546 B1 | 4/2002 | Fecko et al. |
| 6,451,430 B1 | 9/2002 | Smith |
| 6,467,118 B2 | 10/2002 | Dumlao et al. |
| 6,496,190 B1 | 12/2002 | Driemeyer et al. |
| 6,497,190 B1 | 12/2002 | Lewit |
| 6,497,932 B1 | 12/2002 | Muench et al. |
| 6,502,894 B1 | 1/2003 | Ingram et al. |
| 6,505,883 B1 | 1/2003 | Ehrlich |
| 6,543,469 B2 | 4/2003 | Lewit et al. |
| 6,615,741 B2 | 9/2003 | Fecko et al. |
| 6,626,622 B2 | 9/2003 | Zubko |
| 6,659,020 B1 | 12/2003 | Ball |
| 6,660,373 B2 | 12/2003 | Hsu et al. |
| 6,688,835 B1 | 2/2004 | Buher |
| 6,723,273 B2 | 4/2004 | Johnson et al. |
| 6,726,435 B1 | 4/2004 | Williams et al. |
| 6,740,381 B2 | 5/2004 | Day et al. |
| 6,745,470 B2 | 6/2004 | Foster et al. |
| 6,755,998 B1 | 6/2004 | Reichard et al. |
| 6,761,840 B2 | 7/2004 | Fecko et al. |
| 6,773,023 B2 | 8/2004 | Athans et al. |
| 6,780,923 B2 | 8/2004 | Guha et al. |
| 6,797,102 B2 | 9/2004 | Garcia et al. |
| 6,824,341 B2 | 11/2004 | Ehrlich |
| 6,843,525 B2 | 1/2005 | Preisler |
| 6,854,791 B1 | 2/2005 | Jaggi |
| 6,863,339 B2 | 3/2005 | Boehm et al. |
| 6,869,561 B2 | 3/2005 | Johnson et al. |
| 6,877,940 B2 | 4/2005 | Nelson et al. |
| 6,893,075 B2 | 5/2005 | Fenton et al. |
| 6,911,252 B2 | 6/2005 | Lewit et al. |
| 6,986,546 B2 | 1/2006 | Ehrlich |
| 7,000,978 B1 | 2/2006 | Messano |
| 7,025,166 B2 | 4/2006 | Thomas |
| 7,025,408 B2 | 4/2006 | Jones et al. |
| 7,069,702 B2 | 7/2006 | Ehrlich |
| 7,114,762 B2 | 10/2006 | Smidler |
| 7,134,820 B2 | 11/2006 | Ehrlich |
| 7,140,642 B2 | 11/2006 | Ito et al. |
| 7,150,915 B2 | 12/2006 | Kia et al. |
| 7,182,396 B2 | 2/2007 | Taylor |
| 7,189,345 B2 | 3/2007 | Sewell et al. |
| 7,217,771 B2 | 5/2007 | Setiabudi |
| 7,219,952 B2 | 5/2007 | Taylor |
| 7,264,305 B2 | 9/2007 | Kuriakose |
| 7,287,797 B1 | 10/2007 | Belloso |
| 7,353,960 B2 | 4/2008 | Seiter |
| 7,407,216 B2 | 8/2008 | Taylor |
| 7,434,520 B2 | 10/2008 | Zupancich et al. |
| 7,451,995 B2 | 11/2008 | Bloodworth et al. |
| 7,461,888 B2 | 12/2008 | Brown |
| 7,517,005 B2 | 4/2009 | Kuriakose |
| 7,575,264 B1 | 8/2009 | Solomon |
| 7,578,534 B2 | 8/2009 | Wuerfel, III |
| 7,578,541 B2 | 8/2009 | Layfield et al. |
| 7,587,984 B2 | 9/2009 | Zupancich et al. |
| 7,588,286 B2 | 9/2009 | Lewallen et al. |
| 7,594,474 B2 | 9/2009 | Zupancich |
| 7,608,313 B2 | 10/2009 | Solomon et al. |
| 7,621,589 B1 | 11/2009 | Gerome |
| 7,638,085 B2 | 12/2009 | Caiazzo |
| 7,704,026 B2 | 4/2010 | Roush et al. |
| 7,722,112 B2 | 5/2010 | Ehrlich |
| 7,748,172 B2 | 7/2010 | Zupancich et al. |
| 7,762,618 B2 | 7/2010 | Lewallen et al. |
| 7,770,928 B2 | 8/2010 | Booher |
| 7,790,076 B2 | 9/2010 | Seiter et al. |
| 7,829,165 B2 | 11/2010 | Grandominico et al. |
| 7,887,120 B2 | 2/2011 | Boivin et al. |
| 7,901,537 B2 | 3/2011 | Jones et al. |

(56) References Cited

U.S. PATENT DOCUMENTS

| | | |
|---|---|---|
| 7,905,072 B2 | 3/2011 | Verhaeghe |
| 7,914,034 B2 | 3/2011 | Roush |
| 7,931,328 B2 | 4/2011 | Lewallen et al. |
| 7,980,840 B2 | 7/2011 | Burchardt et al. |
| 8,016,322 B2 | 9/2011 | Keehan et al. |
| 8,056,960 B2 | 11/2011 | Brown |
| 8,096,728 B2 | 1/2012 | Stasiewich et al. |
| 8,186,747 B2 | 5/2012 | Bloodworth et al. |
| 8,263,217 B2 | 9/2012 | Verhaeghe |
| 8,297,027 B2 | 10/2012 | Noble et al. |
| 8,342,588 B2 | 1/2013 | Skaradzinski |
| 8,361,590 B2 | 1/2013 | Chakraborty et al. |
| 8,448,989 B2 | 5/2013 | Verhaeghe |
| 8,465,042 B2 | 6/2013 | Knollman |
| 8,474,171 B1 | 7/2013 | Simmons |
| 8,474,871 B1 | 7/2013 | Ludwick |
| 8,696,048 B2 | 4/2014 | Griffin et al. |
| 8,757,704 B2 | 6/2014 | Zhao et al. |
| 8,814,255 B2 | 8/2014 | Yamaji et al. |
| 8,876,193 B2 | 11/2014 | Kunkel et al. |
| 8,882,041 B2 * | 11/2014 | Mueller ............... B64C 1/403 |
| | | 296/181.6 |
| 8,950,144 B2 | 2/2015 | Padmanabhan |
| 9,051,014 B2 | 6/2015 | Lookebill et al. |
| 9,138,943 B2 | 9/2015 | Weinberg et al. |
| 9,138,974 B2 | 9/2015 | Weinberg et al. |
| 9,138,975 B2 | 9/2015 | Weinberg et al. |
| 9,174,656 B2 | 11/2015 | Heitmeyer et al. |
| 9,199,440 B2 | 12/2015 | Weinberg et al. |
| 9,205,635 B2 | 12/2015 | Weinberg et al. |
| 9,260,117 B2 | 2/2016 | Vande Sande |
| 9,317,468 B2 | 4/2016 | Liebald et al. |
| 9,339,987 B2 | 5/2016 | Weinberg et al. |
| 9,371,468 B2 | 6/2016 | Lewit |
| 9,399,492 B2 | 7/2016 | Booher |
| 9,409,607 B2 | 8/2016 | Osten |
| 9,434,421 B1 | 9/2016 | Lu et al. |
| 9,441,660 B2 * | 9/2016 | Meyers ............... B32B 37/146 |
| 9,499,203 B1 | 11/2016 | Finley |
| 9,566,769 B2 | 2/2017 | Weinberg et al. |
| 9,604,677 B2 | 3/2017 | Mckinney et al. |
| 9,650,003 B2 | 5/2017 | Owens et al. |
| 9,708,009 B2 | 7/2017 | Vance |
| 9,738,050 B2 | 8/2017 | Lee et al. |
| 9,744,753 B2 | 8/2017 | Sheffield et al. |
| 9,815,501 B2 | 11/2017 | Mccormack et al. |
| 9,827,750 B2 | 11/2017 | Lookebill et al. |
| 9,828,164 B2 | 11/2017 | Denson |
| 9,878,744 B2 | 1/2018 | Lu et al. |
| 9,884,660 B2 | 2/2018 | Fenton |
| 9,884,661 B2 | 2/2018 | Fenton |
| 9,889,637 B2 | 2/2018 | Weinberg et al. |
| 10,239,265 B2 | 3/2019 | Lewit et al. |
| 10,239,566 B2 | 3/2019 | Bauer et al. |
| 10,329,763 B2 | 6/2019 | Mccloud et al. |
| 10,407,103 B2 | 9/2019 | Hatke |
| 10,479,419 B2 | 11/2019 | Storz et al. |
| 10,487,864 B2 * | 11/2019 | Schmidt ............... F16B 5/0621 |
| 10,549,789 B2 | 2/2020 | Mccloud |
| 10,550,569 B2 | 2/2020 | Mccloud et al. |
| 10,596,791 B2 | 3/2020 | Lewit |
| 10,596,950 B2 * | 3/2020 | Bauer ............... B62D 65/02 |
| 10,829,163 B2 | 11/2020 | Mccloud et al. |
| 10,919,579 B2 | 2/2021 | McCloud |
| 10,967,920 B2 | 4/2021 | Bauer et al. |
| 11,299,213 B2 | 4/2022 | McCloud |
| 11,338,862 B2 | 5/2022 | McCloud |
| 11,400,987 B2 | 8/2022 | McCloud |
| 11,542,005 B2 * | 1/2023 | Scheer ............... B60P 7/0807 |
| 11,807,309 B2 | 11/2023 | Mccloud et al. |
| 2001/0011832 A1 | 8/2001 | Ehrlich et al. |
| 2001/0015222 A1 | 8/2001 | Lewit et al. |
| 2002/0033619 A1 | 3/2002 | Hurst et al. |
| 2005/0194381 A1 | 9/2005 | Zupancich et al. |
| 2005/0241253 A1 | 11/2005 | Song et al. |
| 2006/0065152 A1 | 3/2006 | Heitmeyer et al. |
| 2006/0087152 A1 | 4/2006 | Kuriakose |
| 2006/0108361 A1 | 5/2006 | Seiter |
| 2006/0121244 A1 | 6/2006 | Godwin et al. |
| 2006/0123725 A1 | 6/2006 | Godwin |
| 2006/0144014 A1 | 7/2006 | Yoon et al. |
| 2006/0158005 A1 | 7/2006 | Brown |
| 2006/0179733 A1 | 8/2006 | Padmanabhan |
| 2006/0201081 A1 | 9/2006 | Godwin |
| 2006/0219129 A1 | 10/2006 | Jarvis |
| 2006/0287463 A1 | 12/2006 | Wehner |
| 2007/0001343 A1 | 1/2007 | Pulman et al. |
| 2007/0049686 A1 | 3/2007 | Bauchet et al. |
| 2007/0095092 A1 | 5/2007 | Wuerfel |
| 2007/0102961 A1 | 5/2007 | Lemmons |
| 2007/0119850 A1 | 5/2007 | Seiter |
| 2007/0132278 A1 | 6/2007 | Lester et al. |
| 2007/0160793 A1 | 7/2007 | Cageao et al. |
| 2007/0194602 A1 | 8/2007 | Ehrlich |
| 2007/0204550 A1 | 9/2007 | McPherson |
| 2007/0216197 A1 | 9/2007 | Wuerfel |
| 2007/0250025 A1 | 10/2007 | Sams et al. |
| 2008/0078038 A1 | 4/2008 | Borazghi |
| 2008/0160307 A1 | 7/2008 | Bauchet et al. |
| 2008/0238180 A1 | 10/2008 | Kraenzle |
| 2008/0258500 A1 | 10/2008 | Booher |
| 2008/0290057 A1 | 11/2008 | Zupancich et al. |
| 2008/0296930 A1 | 12/2008 | Roush et al. |
| 2009/0126600 A1 | 5/2009 | Zupancich et al. |
| 2009/0193747 A1 | 8/2009 | Chorney et al. |
| 2009/0212533 A1 | 8/2009 | Verhaeghe |
| 2009/0273205 A1 | 11/2009 | Brown |
| 2009/0278386 A1 | 11/2009 | Ehrlich |
| 2010/0019536 A1 | 1/2010 | Bloodworth et al. |
| 2010/0101876 A1 | 4/2010 | Misencik |
| 2010/0109309 A1 | 5/2010 | Kootstra |
| 2010/0170746 A1 | 7/2010 | Restuccia et al. |
| 2010/0266833 A1 | 10/2010 | Day et al. |
| 2011/0010057 A1 | 1/2011 | Kim |
| 2011/0095574 A1 | 4/2011 | Brown |
| 2011/0129608 A1 | 6/2011 | Adzima et al. |
| 2011/0204611 A1 | 8/2011 | Ziegler et al. |
| 2012/0169087 A1 | 7/2012 | Griffin et al. |
| 2012/0313348 A1 | 12/2012 | Pfaff |
| 2013/0207413 A1 | 8/2013 | Lookebill et al. |
| 2013/0207415 A1 | 8/2013 | Wylezinski |
| 2014/0054916 A1 | 2/2014 | Knudtson et al. |
| 2014/0199551 A1 | 7/2014 | Lewit |
| 2014/0262011 A1 | 9/2014 | Lewit et al. |
| 2014/0300134 A1 | 10/2014 | Gerst |
| 2015/0054311 A1 | 2/2015 | Marchesano et al. |
| 2015/0064433 A1 | 3/2015 | Foster et al. |
| 2015/0076861 A1 | 3/2015 | Padmanabhan |
| 2015/0078804 A1 * | 3/2015 | Ehrlich ............... B60P 7/0807 |
| | | 403/10 |
| 2015/0137560 A1 | 5/2015 | Preisler et al. |
| 2015/0158532 A1 | 6/2015 | Ayuzawa et al. |
| 2015/0203160 A1 | 7/2015 | Peterson et al. |
| 2015/0375478 A1 | 12/2015 | Gruhn et al. |
| 2016/0016229 A1 | 1/2016 | Czinger et al. |
| 2016/0101752 A1 | 4/2016 | Batzer et al. |
| 2016/0207484 A1 | 7/2016 | Rogers et al. |
| 2016/0263873 A1 | 9/2016 | Lewit |
| 2016/0339829 A1 | 11/2016 | Mccloud |
| 2017/0057561 A1 | 3/2017 | Fenton |
| 2017/0166263 A1 | 6/2017 | Mckinney et al. |
| 2017/0210317 A1 | 7/2017 | Owens et al. |
| 2017/0239916 A1 | 8/2017 | Lewit et al. |
| 2017/0240216 A1 | 8/2017 | Bauer et al. |
| 2017/0240217 A1 | 8/2017 | Storz et al. |
| 2017/0241134 A1 | 8/2017 | Mccloud et al. |
| 2017/0247063 A1 | 8/2017 | Banerjee et al. |
| 2017/0253006 A1 * | 9/2017 | Lopez ............... B32B 3/266 |
| 2017/0282499 A1 | 10/2017 | Larocco |
| 2017/0298581 A1 | 10/2017 | Lewit et al. |
| 2017/0334489 A1 | 11/2017 | Shin |
| 2017/0355297 A1 * | 12/2017 | Chimenti ............... B60P 7/0807 |
| 2018/0029688 A1 * | 2/2018 | Connelly ............... B64C 1/40 |
| 2018/0037151 A1 | 2/2018 | Bauer et al. |

(56) References Cited

U.S. PATENT DOCUMENTS

| | | |
|---|---|---|
| 2018/0057059 A1 | 3/2018 | Bauer et al. |
| 2018/0194405 A1 | 7/2018 | Hatke |
| 2018/0244321 A1 | 8/2018 | Mccloud |
| 2019/0047634 A1 | 2/2019 | Mccloud et al. |
| 2019/0061832 A1 | 2/2019 | Mccloud et al. |
| 2019/0176905 A1 | 6/2019 | Bauer et al. |
| 2020/0055549 A1 | 2/2020 | Mccloud et al. |
| 2020/0070894 A1 | 3/2020 | Mccloud et al. |
| 2020/0122783 A1 | 4/2020 | Storz et al. |
| 2020/0130752 A1 | 4/2020 | Mccloud |
| 2020/0180497 A1 | 6/2020 | Bauer et al. |
| 2021/0188365 A1 | 6/2021 | McCloud |
| 2021/0206432 A1 | 7/2021 | Willison |
| 2022/0161871 A1 | 5/2022 | Storz |
| 2022/0289307 A1 | 9/2022 | McCloud |
| 2022/0332374 A1 | 10/2022 | Robinson |
| 2022/0363320 A1 | 11/2022 | Mccloud et al. |

FOREIGN PATENT DOCUMENTS

| | | |
|---|---|---|
| CA | 2181750 A1 | 1/1997 |
| CA | 2199584 A1 | 9/1997 |
| CA | 2551863 A1 | 3/1998 |
| CA | 2219312 A1 | 4/1998 |
| CA | 2242467 A1 | 7/1999 |
| CA | 2261384 A1 | 8/1999 |
| CA | 2265405 A1 | 1/2000 |
| CA | 2275848 A1 | 12/2000 |
| CA | 2382578 A1 | 3/2001 |
| CA | 2253308 C | 7/2002 |
| CA | 2455957 A1 | 5/2004 |
| CA | 2768878 A1 | 3/2005 |
| CA | 2811134 A1 | 4/2006 |
| CA | 2529762 A1 | 6/2006 |
| CA | 2650992 A1 | 11/2006 |
| CA | 2528558 A1 | 5/2007 |
| CA | 2565510 A1 | 8/2007 |
| CA | 2604282 A1 | 3/2008 |
| CA | 2689745 A1 | 7/2009 |
| CA | 2689746 A1 | 7/2009 |
| CA | 2689747 A1 | 7/2009 |
| CA | 2689748 A1 | 7/2009 |
| CA | 2689749 A1 | 7/2009 |
| CA | 2689751 A1 | 7/2009 |
| CA | 2797778 A1 | 7/2009 |
| CA | 2802907 A1 | 7/2009 |
| CA | 2788047 A1 | 8/2011 |
| CA | 2763094 A1 | 7/2012 |
| CA | 2807710 A1 | 8/2013 |
| CA | 2848174 A1 | 10/2014 |
| CA | 2894059 A1 | 12/2015 |
| CA | 2977131 A1 | 9/2016 |
| CA | 2958805 A1 | 8/2017 |
| CA | 2958838 A1 | 8/2017 |
| CA | 2958839 A1 | 8/2017 |
| DE | 2617169 A1 | 11/1977 |
| DE | 10109709 A1 | 8/2002 |
| DE | 102014107357 A1 | 9/2015 |
| DE | 102014113822 A1 | 3/2016 |
| DE | 112020000494 T5 | 11/2021 |
| EP | 1762581 A1 | 3/2007 |
| EP | 2660119 A1 | 11/2013 |
| FR | 2858329 A1 | 2/2005 |
| FR | 3037858 A1 | 12/2016 |
| JP | 06-293233 A | 10/1994 |
| JP | 2010-269676 A | 12/2010 |
| JP | 2011-063724 A | 3/2011 |
| WO | 2004/013236 A2 | 2/2004 |
| WO | 2006/091446 A1 | 8/2006 |
| WO | 2016/137974 A1 | 9/2016 |
| WO | 2017/001337 A1 | 1/2017 |
| WO | 2020/152240 A1 | 7/2020 |

OTHER PUBLICATIONS

"Design, synthesis and properties of new materials based on densely crosslinked polymers for polymer optical fiber and amplifier applications" Flipsen, University of Groningen 1-230 (2000).

"Fiber Optic FTRI: A Novel PUR/PIR Catalyst Development Tool" McDaniels et al., Polyurethanes Expo 303-12 (1999) (Abstract).

"Rheology Study in Polyurethane Rigid Foams" Wu et al., Huntsman Corporation (2012).

Black, Sara, "Structural adhesives, Part I: Industrial," CompositesWorld, posted Apr. 11, 2016, 7 pages.

CMS North America, Inc., "Transportation: Refrigerated Semi-trailers, Trailers & Vans," available online at http://www.cmsna.com/13_transportation_refrigerated_semi_trailers_trailer-s_vans.php on or before Jul. 2, 2014, 2 pages.

Composite Marine Control Surface, installed on USS Pioneer (MCM 9), May 1997, 13 pages.

Composite Twisted Rudder, TCC Meeting 2008, handout, 32 pages.

EPO Translation of DE 102014107357A1 (Year: 2019).

Eric Green Associates.com, "Composite Rudders Take Shape for U.S. Navy" available online at http://www.ericgreeneassociates.com/images/Composite_Twisted_Rudder.pdf, accessed as early as Jul. 13, 2014, 7 pages.

Expedition Portal, "Truck Camper Construction Costs?," available online at http://www.expeditionportal.com/forum/threads/12486-Truck-Camper-Construction-Costs at least as early as Jun. 18, 2015, 5 pages.

Griffiths, Bob, "Rudder Gets New Twist with Composites," CompositesWorld, posted Aug. 1, 2006, 4 pages.

Gum, W. et al., "Reaction Polymers", 1992, 50-202.

International Preliminary Report on Patentability received for PCT Patent Application No. PCT/US2014/010545, mailed on Jul. 30, 2015, 10 pages.

International Preliminary Report on Patentability received for PCT Patent Application No. PCT/US2016/019100, mailed on Jun. 8, 2017, 30 pages.

International Preliminary Report on Patentability received for PCT Patent Application No. PCT/US2016/050509, mailed on Dec. 15, 2017, 20 pages.

International Search Report and Written Opinion issued by the ISA/US, Commissioner for Patents, dated May 9, 2016, for International Application No. PCT/US2016/019100; 12 pages.

International Search Report and Written Opinion issued by the ISA/US, Commissioner for Patents, dated Nov. 29, 2016, for International Application No. PCT/US2016/050509; 11 pages.

International Search Report and Written Opinion received for PCT Patent Application No. PCT/US2014/010545, mailed on Jul. 2, 2014, 14 pages.

International Trucking Shows, "True Composites Platform Highlight of International Trucking Show," Aug. 1992, 1 page.

Johnson Truck Bodies, Blizzard Series brochure, accessed as early as Aug. 1, 2014, 8 pages.

Kedward, Keith and Whitney, James, Delaware Composites Design Encyclopedia, "Design Studies," vol. 5, 1990, preview version available at https://books.google.com/books?id=9-KYOm81MWEC&printsec-frontcover#/v=0-nepage&q&f=false, 17 pages.

Lightweight Structures B.V., "ColdFeather: lightweight composite isothermal trailer," available online at http://www.lightweight-structures.com/coldfeather-lightweight-composite-i- sothermal-trailer/index.html at least as early as Jun. 18, 2015, 6 pages.

Morey, Bruce, "Advanced Technologies Supplement: Processes Reduce Composite Costs," Advanced Manufacturing, posted Apr. 1, 2007, 7 pages.

NetCompositesnow.com, "Twisted Composites Rudders," available online at http://www.netcomposites.com/news/twisted-composites-rudders/3202 as early as Aug. 11, 2005, 3 pages.

North American Composites, Virtual Engineered Composites (VEC) Article, available online at http://www.nacomposites.com/delivering-performance/page.asp?issueid=7&pag- e=cover, Fall 2006, 4 pages.

(56) References Cited

OTHER PUBLICATIONS

Ramis, X. et al., "Polyurethane-unsaturated polyester interpenetrating polymer networks: thermal and dynamic mechanical thermal behaviour," Polymer 42 (2001) 9469-9479.
Reichard, Dr. Ronnal P., "Composites in Theme Parks: From the perspective of a contractor-trouble shooter-enthusiast!" presented at Florida Institute of Technology at least as early as 1999, 37 pages.
Sandler et al., Polymer Syntheses, vol. III, Academic Press (1996), Ch. 4, "Polymerization Reactions of Mono-and Diisocyanates," pp. 120-151.
Scott Bader Group Companies, Crystic, "Composites Handbook", copyright Dec. 2005, 100 pages.
Seaver, Mark and Trickey, Stephen, "Underwater Blast Loading of a Composite Twisted Rudder with FBGS," dated Apr. 14, 2008, 19th International Conference on Optical Fibre Sensors, 2 pages.
Selby N300 CR product data sheet, Degussa Building Systems, Copyright 2003, 4 pages.
Sonnenschein, Polyurethanes: Science, Technology, Markets, and Trends, Chapter 1, John Wiley & Sons. (Year: 2014).
Sonnenschein, Polyurethanes: Science, Technology, Markets, and Trends, Wiley (2015), pp. 1-9 (introduction) and pp. 255-281, 291-293 (Ch. 8).
Stypol (Registered) & Xycon (Registered) Resins Data Sheet, Cook Composites & Polymers, printed Jan. 13, 2010 and Apr. 21, 2009, 10 pages.
Trailer/Body Builders, "More Emphasis on Less Weight," available at http://trailer-bodybuilders.com/trailers/more-emphasis-less-weight, May 1, 2008, 5 pages.
Wabash National Commercial Trailer Products, DuraPlate.RTM. Dry Freight Truck Bodies, Oct. 2015, 2 pages.
Wang, G. et al., "Interpenetrating polymer networks of polyurethane and graft vinyl ester resin: polyurethane formed with toluene diisocyanate," Eur. Polym. J. 36 (2000), 735-742.
Xycon (Registered) IPN Resin Systems Data Sheet, Cook Composites & Polymers, printed Apr. 21, 2009, 10 pages.
Zweben, Carl, Handbook of Materials Selection, "Chapter 12: Composite Materials," 2002, preview version available at https://books.google.com/books?id=gWg-rchM700C&printsec=frontcover#/v-onep- age&q&f=false, 47 pages.

* cited by examiner

EMBEDDED MOUNTING INSERTS

CROSS-REFERENCE TO RELATED APPLICATION

The present application claims priority to U.S. Provisional Patent Application No. 63/286,657, filed Dec. 7, 2021, entitled "EMBEDDED MOUNTING INSERTS", the entire disclosure of which is incorporated by reference herein.

FIELD OF THE DISCLOSURE

The present disclosure relates generally to mounting inserts embedded within composite structures and methods of making the same. More particularly, the present disclosure relates to embedded mounting inserts of cargo truck bodies, vans, or trailers for the mounting of large components, such as refrigeration units.

BACKGROUND OF THE DISCLOSURE

Cargo vehicles are used in the transportation industry for transporting many different types of cargo. Certain cargo vehicles may be refrigerated and insulated to transport temperature-sensitive cargo. Cargo vehicles may be constructed using composite materials, which may lead to an absence of or reduction in metallic and wood materials and associated advantages, including simplified construction, thermal efficiency, reduced water intrusion and corrosion, and improved fuel efficiency through weight reduction, for example.

The mounting of a temperature control unit to a cargo vehicle, such as a refrigerated truck body, requires the consideration of such a load, including the structural integrity for general movement of the vehicle and moments of extreme movement of the vehicle, for example, during a sudden stop. Conventional mounting techniques within composite vehicles require at least some destruction of the integrity of the composite material and may require unfavorable placement of stress loading and/or expensive and time-intensive manufacturing techniques. As such, there is a need to support a refrigeration unit on a cargo vehicle in a manner that preserves the structural integrity of the wall or panel on which it is supported.

SUMMARY OF THE DISCLOSURE

The present disclosure provides an embedded mounting assembly for mounting a large component (e.g., a refrigeration unit) to a cargo vehicle. The mounting assembly includes a mounting insert embedded within a wall of the cargo vehicle to support the loading of the large component while providing for cost-effective manufacturing and installation without reduction of structural integrity and safety.

In a first aspect of the present disclosure, a mounting unit for supporting a refrigeration unit on a cargo body is disclosed, the mounting unit comprising a first body including a first opening; a second body including a second opening corresponding with the first opening; and a mounting bolt configured to be received within the first opening and the second opening. A length of the mounting bolt extends beyond both of the first body and the second body when the mounting bolt is received within the first opening and the second opening. The first body and the second body are configured to be supported within a nose of the cargo body.

In another aspect of the present disclosure, a nose of a cargo body for mounting a large component is disclosed. The nose is formed of a composite material having a foam core, an inner surface, and an outer surface having an outer laminate later. The nose comprises a support plate embedded within the outer laminate layer, the support plate defining a bolt aperture; a mounting insert positioned within a hole defined by the composite material; and a cover plate fastened to the mounting insert with a mechanical fastener. The hole of the mounting insert extends from the inner surface of the nose through the foam core so that the mounting insert does not extend beyond the inner surface of the nose, the mounting insert comprising a mounting bolt positioned within a through hole of the mounting unit so that a portion of the mounting bolt extends through the bolt aperture of the support plate and beyond the outer surface of the nose.

In yet another aspect of the present disclosure, a method of manufacturing a wall of a cargo body having embedded inserts is disclosed. The method comprises assembling a plurality of composite beams or composite panels to form the wall; forming a hole within an inner surface of the wall so that the hole extends from an inner surface of the wall to an outer surface of the wall without penetrating the outer surface; inserting a mounting insert within the hole; forming a bolt aperture within an outer surface of the wall; inserting a mounting bolt through the mounting insert so that the mounting bolt extends through the bolt aperture; and coupling a cover plate to at least one of the mounting insert or the inner surface of the wall so that the cover plate covers the mounting insert.

In various aspects of the disclosure, the first body may define a plurality of cavities. The second body may define a plurality of cavities. The first opening may be a stepped opening within a third opening, wherein the third opening is configured to receive a head of the mounting bolt. The third opening may be hexagon-shaped. The first body may include at least one pilot hole for receiving a mechanical fastener. The mounting unit may further comprise an insulation gasket to cover a surface of the first body. The mounting unit may further comprise a cover plate to cover the insulation gasket, the cover plate configured to couple to the first body with the mechanical fastener. The mounting unit may further comprise a gasket positioned around the mounting bolt.

In various aspects of the disclosure, the cover plate may be permanently bonded to the inner surface of the nose. The nose may further comprise an insulation gasket disposed between the mounting insert and the cover plate. The nose may further comprise a plurality of mounting inserts. The mounting bolt may not extend beyond an inner surface of the nose. The mounting insert may be comprised of a first body and a second body.

In various aspects of the disclosure, the step of coupling the cover plate may include the step of permanently bonding the cover plate to the inner surface of the wall. The step of coupling the cover plate may further include the step of coupling the cover plate to the mounting insert with a mechanical fastener. The step of inserting a mounting insert within the hole may include the steps of inserting a first body having a first through hole configured to align with the bolt aperture into the hole and inserting a second body including a second through hole configured to align with the first through hole and the bolt aperture into the hole. The mounting bolt may extend past only one surface of the mounting insert when inserted within the mounting insert.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
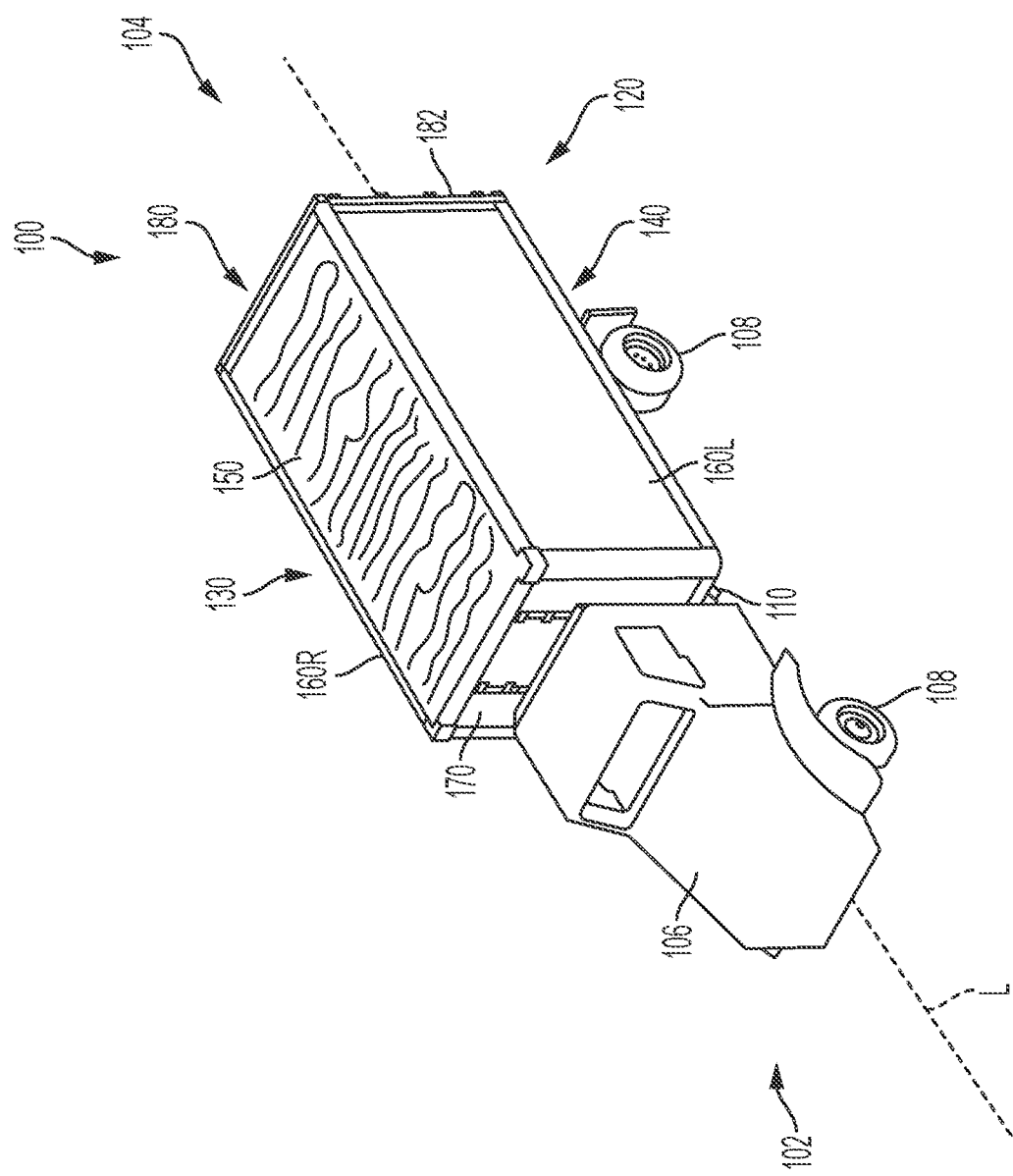
FIG. 1 is a perspective view of a cargo vehicle having a cargo body having a floor assembly, a roof, right and left sidewalls, and a front wall or nose.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

1. Cargo Vehicle

Referring initially to FIG. 1, a cargo vehicle 100 is shown for supporting and transporting cargo. The illustrative straight frame vehicle 100 extends along a longitudinal axis L from a front end 102 to a rear end 104 and includes a motorized truck 106 that powers a plurality of wheels 108 or other traction devices, a chassis 110, and a bumper assembly 120. The illustrative vehicle 100 further includes a cargo body 130 having a floor assembly 140 for supporting cargo, a roof 150, right and left sidewalls 160R, 160L, a front wall or nose 170, and a rear door assembly 180 having a rear frame 182 and a door (not shown) to access the cargo body 130.

In the illustrated embodiment of FIG. 1, cargo body 130 is an enclosed body that is supported atop chassis 110. Cargo body 130 may be refrigerated and/or insulated to transport temperature-sensitive cargo. While the concepts of this disclosure are described in relation to a refrigerated truck body, it will be understood that they are equally applicable to other vehicles generally, and more specifically to refrigerated van semi-trailers, dry freight trailers, including dry freight van semi-trailers, other commercial box trailers, and the like. Accordingly, those skilled in the art will appreciate that the present invention may be implemented in a number of different applications and embodiments and is not specifically limited in its application to the particular embodiments depicted herein.

2. Composite Panels

Cargo body 130 may be constructed, at least in part, of composite panels. For example, the floor 140, roof 150, right and left sidewalls 160R, 160L, and/or nose 170 of the composite cargo body 130 may be constructed of composite materials. As such, the floor 140, roof 150, right and left sidewalls 160R, 160L, and/or nose 170 of the composite cargo body 130 may be referred to herein as composite panels. Each composite panel may be a single, unitary component, which may be formed from a plurality of layers permanently coupled together. Exemplary composite materials for use in the composite cargo body 130 include fiber-reinforced polymers or plastics (FRPs), for example glass-fiber-reinforced polymers or plastics (GFRPs) and carbon-fiber-reinforced polymers or plastics (CRPs).

Figure 2:
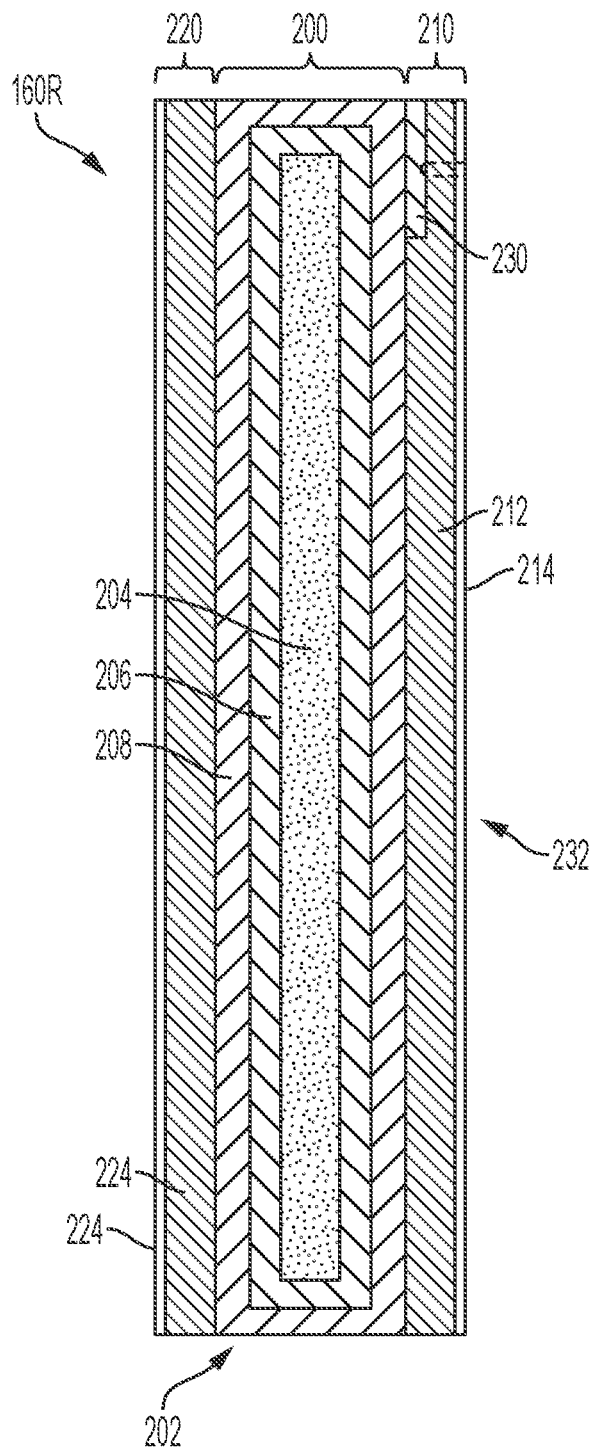
FIG. 2 is a cross-sectional view of the right sidewall of FIG. 1, the right sidewall being formed of composite material.

A laminated composite right sidewall 160R is shown in cross-section in FIG. 2. Those skilled in the art will appreciate that the following teachings related to the right sidewall 160R may also be applied to the floor 140, roof 150, left sidewall 160L, and/or nose 170 of the composite cargo body 130. With respect to the composite floor 140, in particular, details of the construction may be found U.S. Pat. No. 10,829,163, the disclosure of which is hereby incorporated by reference in its entirety.

The illustrative sidewall 160R of FIG. 2 includes a core layer 200, an outer skin layer 210 that faces outwardly from the cargo body 130 (FIG. 1) toward the surrounding environment, and an inner skin layer 220 that faces inwardly toward the cargo in cargo body 130 (FIG. 1). Each of these laminated layers 200, 210, 220 is described further below.

Referring still to FIG. 2, the core layer 200 of the composite sidewall 160R may include one or more structural supports or preforms 202. Exemplary preforms 202 for use in core layer 200 include PRISMA® preforms provided by Compsys, Inc. of Melbourne, Florida. Each preform 202 may include an inner foam core 204, an intermediate layer 206, and an outer FRP layer 208, each of which is described further below.

The inner foam core 204 of each preform 202 may include a self-expanding, self-curing structural foam material. Suitable foams include polyurethane foams, such as a methylene-diphenyl-methane diisocyanate (MDI) based rigid polyurethane foam, for example.

The outer FRP layer 208 (which may be referred to herein as the "first" FRP layer 208) of each preform 202 may include a polymer matrix reinforced with fibers configured to enhance the structural properties of the surrounding polymer matrix. Suitable reinforcing fibers include glass fibers, carbon fibers, aramid fibers (e.g., Kevlar® fibers available from DuPont Protection Technologies of Richmond, Virginia), linear polyethylene or polypropylene fibers (e.g., Spectra® fibers available from Honeywell International Inc. of Morris Plains, New Jersey), or polyester fibers. The reinforcing fibers may be present in fabric form, which may be mat, woven, or knit, for example. Exemplary fabrics include chopped fiber fabrics, such as chopped strand mats (CSM), and continuous fiber fabrics, such as 0°/90° fiberglass fabrics, +45°/−45° fiberglass fabrics, +60°/−60° fiberglass fabrics, 0° warp unidirectional fiberglass fabrics, and other stitched fiber fabrics, for example. Exemplary fabrics are commercially available from Vectorply Corporation of Phenix City, Alabama and include the E-LM 1810 fiberglass fabric with 0° unidirectional fibers, the E-LTM 3610 fiberglass fabric with 0°/90° fibers, and the EL TM 2408 fiberglass fabric with 0°/90° fibers, for example. Such fabrics may have an area density of about 800 g/m2 to about 1,500 g/m2 or more.

The intermediate layer 206 of each preform 202 may serve as a transition layer for coupling the inner foam core 204 to the outer FRP layer 208. The intermediate layer 206 may be sufficiently porous to at least partially receive foam from the adjacent foam core 204 and the polymer matrix from the adjacent FRP layer 208. The intermediate layer 206 may be a nonwoven fabric with continuous or chopped fibers.

The individual preforms 202 of the core layer 200 may be designed to accommodate the needs of the particular application. For example, in areas of the final structure requiring more strength and/or insulation, a low-density foam core 204 may be replaced with a high-density foam core 204 or a hard, plastic block. The individual preforms 202 of the core layer 200 may also be sized, shaped, and arranged in a manner that accommodates the needs of the particular application. For example, in areas of the final structure requiring less strength (for example, most areas of the roof 150), the preforms 202 may be relatively large in size, with the foam cores 204 spanning relatively large distances before reaching the surrounding layers 206, 208. By contrast, in areas of the final structure requiring more strength (for example, most areas of the floor 140), the preforms 202 may be relatively small in size, with the foam cores 204 spanning relatively small distances before reaching the surrounding layers 206, 208. Stated differently, the preforms 202 may be shaped as relatively wide panels in areas of the final structure requiring less strength and as relatively narrow support beams in areas of the final structure requiring more strength.

Referring still to FIG. 2, the outer skin layer 210 of the composite sidewall 160R may include a FRP layer 212 and an outer gel coat 214. The FRP layer 212 (which may be referred to herein as the "second" FRP layer 212) may be similar to the above-described first FRP layer 208, including a polymer matrix reinforced with suitable reinforcing fibers. According to an exemplary embodiment of the present disclosure, a plurality of different reinforcing fiber layers may be stacked together and used in combination to form the FRP layer 212. For example, a chopped fiber fabric (e.g., CSM) may be positioned adjacent to a continuous fiber fabric. In this stacked arrangement, the chopped fibers may help support and maintain the adjacent continuous fibers in place, especially around corners or other transitions. Also, the chopped fibers may serve as a web to resist column-type loads in compression, while the adjacent continuous fibers may resist flange-type loads in compression. Adjacent reinforcing fiber layers may be stitched or otherwise coupled together to simplify manufacturing, to ensure proper placement, and to prevent shifting and/or bunching. The outer gel coat 214 may be a polymer-rich or polymer-only layer that provides a smooth outer finish in a desired color.

Referring still to FIG. 2, the inner skin layer 220 of the composite sidewall 160R may include a FRP layer 222 and an optional inner gel coat 224. The FRP layer 222 (which may be referred to herein as the "third" FRP layer 222) may be similar to the above-described first and second FRP layers 208, 212, including a polymer matrix reinforced with suitable reinforcing fibers. The inner gel coat 224 may be a polymer-rich or polymer-only layer similar to the above-described outer gel coat 214 that provides a smooth inner finish in a desired color.

During manufacturing, the composite panels of the present disclosure, including the composite sidewall 160R of FIG. 2, may be formed by a layered molding process. An exemplary molding process involves (1) applying a gel-coat resin onto a mold surface to form the outer gel coat 214, (2) layering the reinforcing fibers of the outer FRP layer 212, the preforms 202 of the core layer 200, the reinforcing fibers of the inner FRP layer 222, and any other desired layers onto the outer gel coat 214, (3) wetting out the layers 212, 200, 222, and any other applied layers with at least one laminating resin to impregnate and/or coat the fibers, (4) optionally applying another gel-coat resin onto the layers 212, 200, 222 to form the inner gel coat 224, and (5) curing the materials upon the mold surface (either sequentially and/or simultaneously) to form a single, integral, laminated composite sidewall 160R.

3. Cargo Body Nose for Trailer Refrigeration Unit with Mounting Insert

Figure 3:
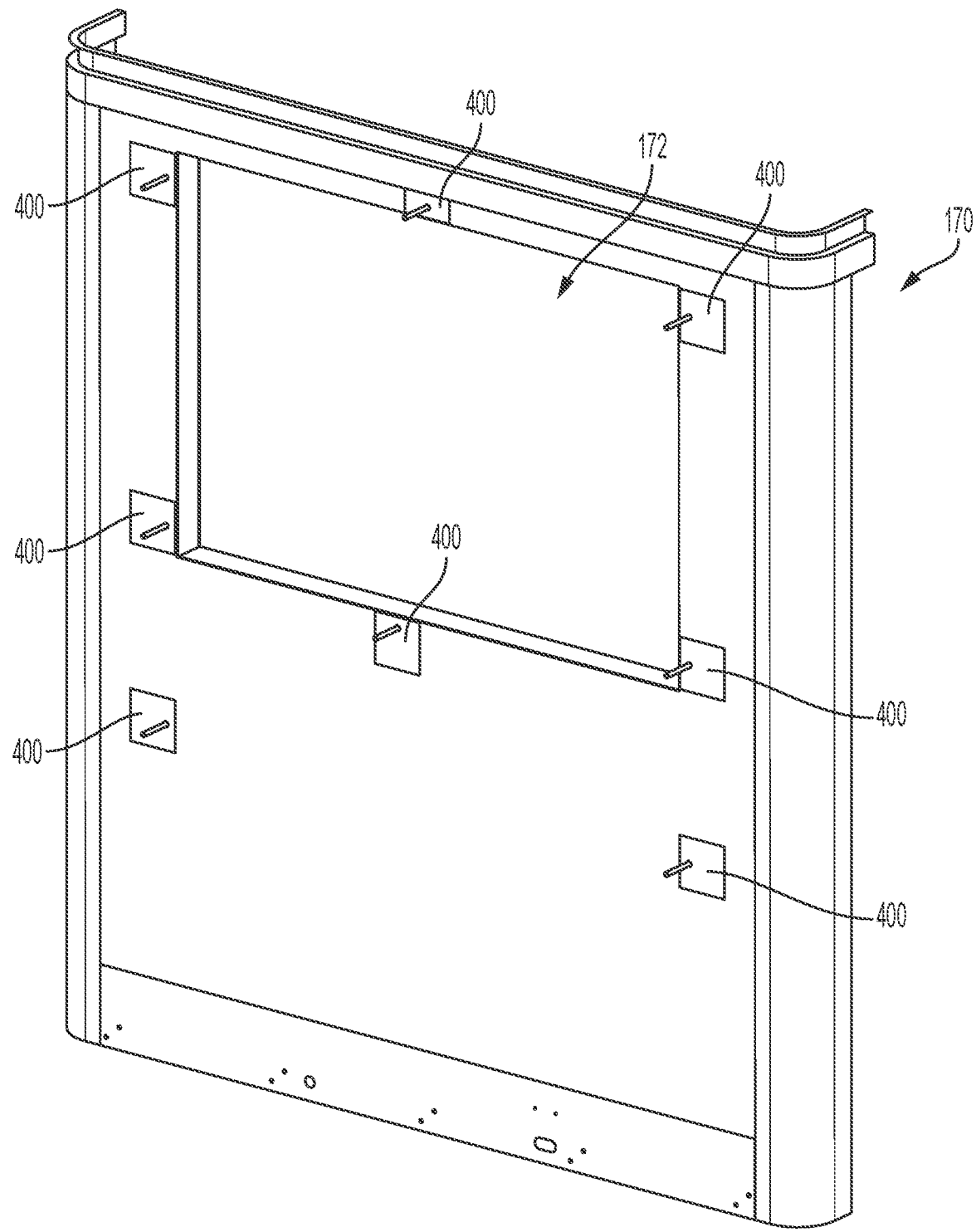
FIG. 3 is a perspective view of the outer surface of the nose of the cargo vehicle with a plurality of mounting units installed.

FIG. 3 illustrates cargo body nose 170 which, illustratively, is configured for a refrigerated van trailer. The nose 170 may be comprised of composite panels or beams 226 (FIG. 4) manufactured as described in Section 2, wherein such beams may be arranged horizontally or vertically and to an optimal thickness as determined by the desired function for cargo body 130 (FIG. 1). The nose 170 defines an opening 172 to facilitate the mounting of a trailer refrigeration unit (not shown) for the temperature control within the cargo body 130 (FIG. 1). During installation, an elastomeric gasket (not shown) may be installed on the outer surface of the nose within the opening 172 of the nose 170 to assist with sealing of the refrigeration unit within the opening 172 as is known in the art.

A plurality of mounting units 400 are strategically positioned and embedded within the nose 170 to facilitate the proper positioning and mounting of the trailer refrigeration unit as discussed further herein. As illustrated additionally in FIG. 4, each mounting unit 400 is embedded within the composite panel or composite beam 226, and includes a mounting insert 402, a support plate 404 embedded within an outer laminate layer 174 of the nose 170, a mounting bolt 406 disposed through the mounting insert 402 and the support plate 404 to extend beyond an outer surface 178 of the nose 170, a cover plate 408 coupled to an inner surface 176 of the nose 170, and an insulation gasket 410 disposed between the cover plate 408 and the mounting insert 402. At least one mechanical fastener, such as a cover plate screw 412, may facilitate coupling of the cover plate 408 to the inner surface 176 of the nose 170 as discussed further herein.

Figure 4:
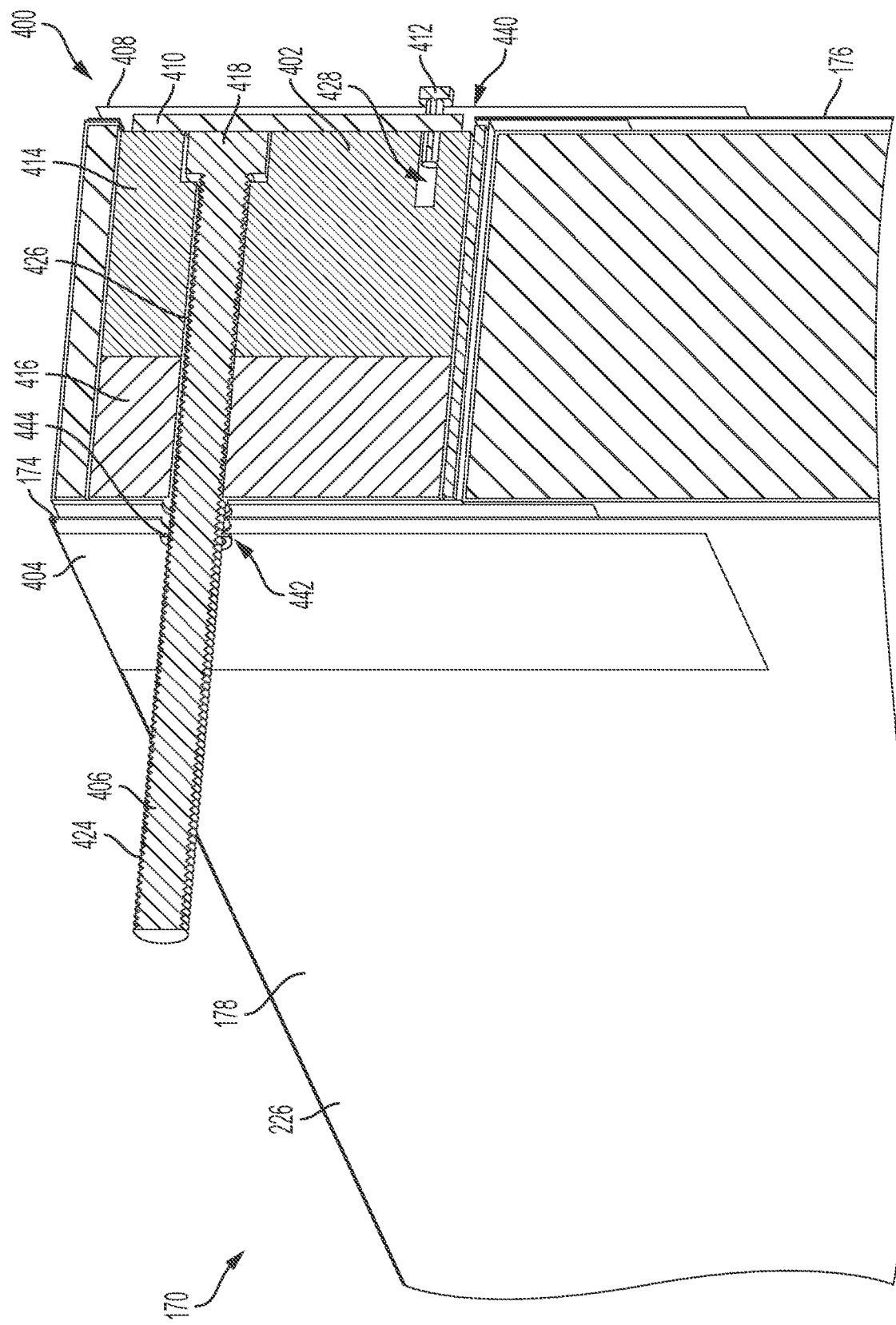
FIG. 4 is a cross-sectional view of a mounting unit of FIG. 3 installed within the nose of the cargo vehicle.
Figure 5:
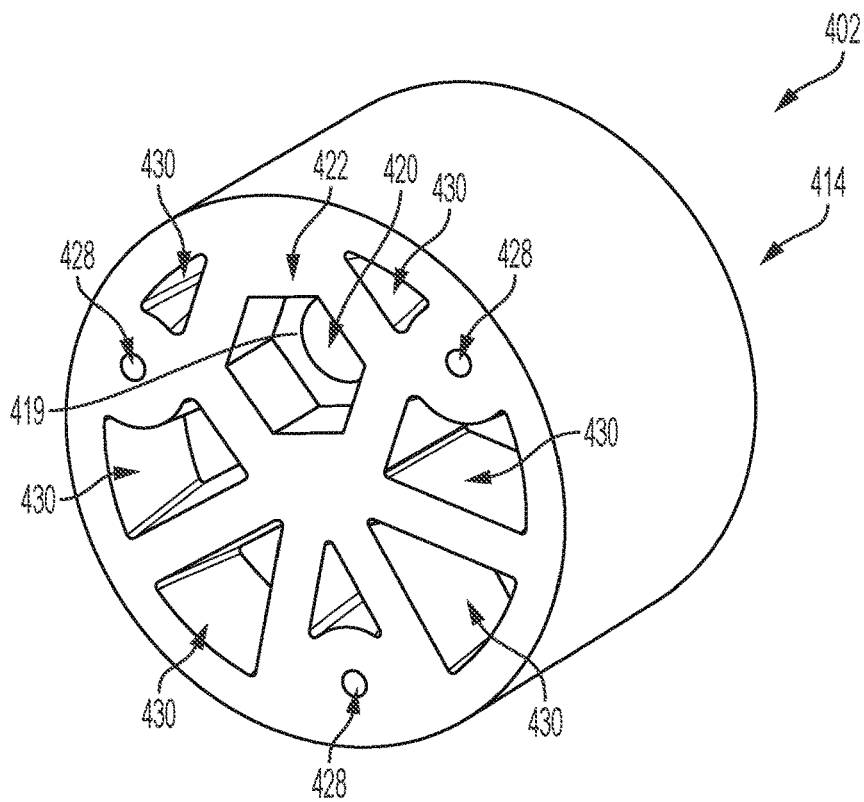
FIG. 5 is a perspective view of a first body of a mounting insert of the mounting unit of FIG. 4.
Figure 6:
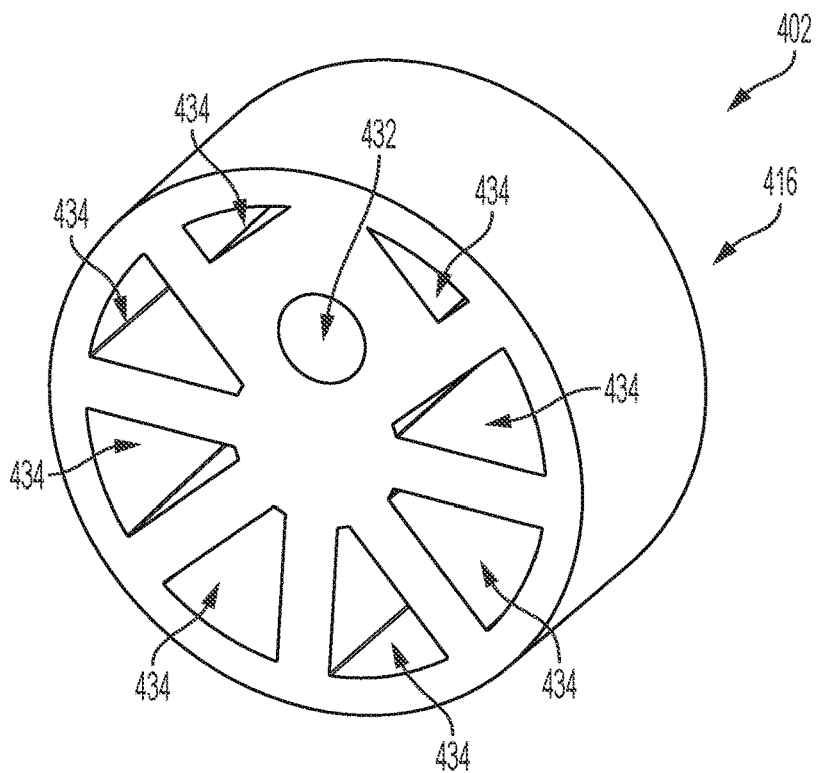
FIG. 6 is a perspective view of a second body of the mounting insert of the mounting unit of FIG. 4.
Figure 7:
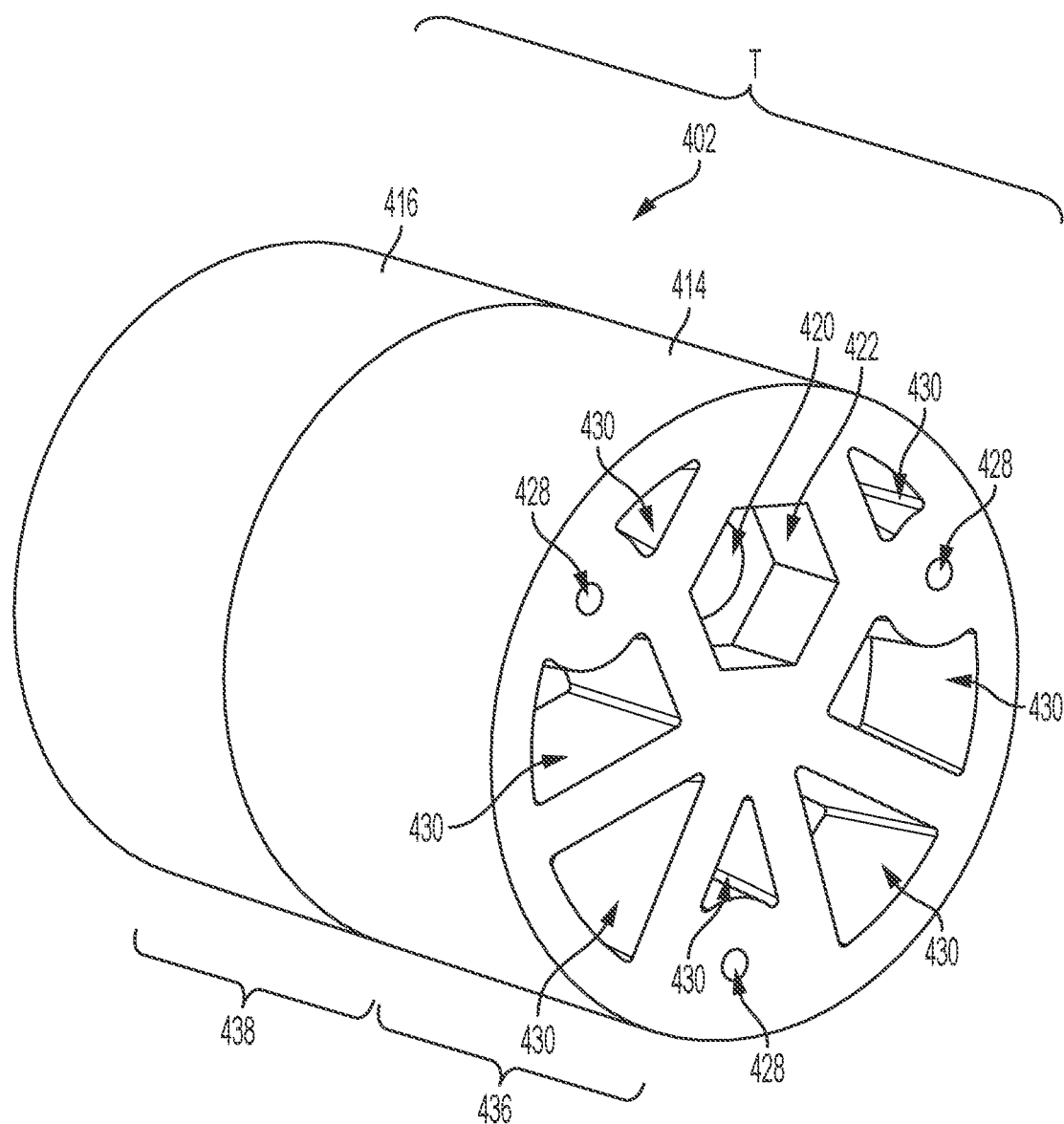
FIG. 7 is a perspective view of the first body of FIG. 5 and the second body of FIG. 6 in a stacked arrangement to form the mounting insert.

Referring to FIGS. 5-7, the mounting insert 402 includes a first body 414 and a second body 416 that are coupled to form a single mounting insert 402. As illustrated in FIG. 5, the first body 414 defines a hexagon-shaped opening 422 sized and shaped to receive a head 418 of the corresponding mounting bolt 406 (FIG. 4), with a through hole 420 stepped within the hexagon-shaped opening 422 to receive threading 424 (FIG. 4) and/or a shank 426 (FIG. 4) of the mounting bolt 406 so that the head 418 of the mounting bolt 406 is fully received within the hexagon-shaped opening 422 and the threading 424 and/or shank 426 of the mounting bolt extends beyond the opposite side of the first body 414. More particularly, a stop surface 419 is positioned within the opening 422 and is configured to contact and outer or underside surface of head 418 while still allowing threading 424 and/or shank 426 to pass through hole 420 of stop surface 419. Head 418 cannot be pulled through opening 422 due to stop surface 419 in combination with the hexagon shape of the opening 422 which may immobilize the bolt 406 once received, as the hexagon shape of the opening is configured to match the hexagon shape of the head 418 of the mounting bolt 406 to prevent rotation of the mounting bolt 406. Such immobilization facilitates ease of installation of the mounting insert 402 as described further herein, as a single person may install the mounting bolt 406 and tighten the corresponding nut (not shown) due to immobilization of the mounting bolt 406.

While the mounting bolt 406 is described herein as including threading 424 and shank 426, it is understood that the mounting bolt 406 may include only threading 424 in lieu of a shank portion. Additionally, it is understood that the length of shank portion 426 may vary according to the various needs of the specified cargo body 130 and associated refrigeration unit. Also, while the opening 422 is described as having a hexagon-shape, another shaped opening may be considered which generally corresponds with at least head 418 of the mounting bolt 406 used for installation.

Still referring to FIG. 5, the first body 414 further defines at least one pilot hole 428 for receiving a mechanical fastener, such as cover plate screw 412 (FIG. 4) to secure the cover plate 408 (FIG. 4) to the first body 414 upon assembly. As illustrated, the first body 414 includes three pilot holes 428 positioned generally equidistantly around a circumference of the first body 414. It is understood that in other embodiments, a greater or fewer number of pilot holes 428 may be provided and positioned alternately as desired to facilitate the fastening of the cover plate 408 (FIG. 4) to the first body 414.

The first body 414 further defines a plurality of cavities 430 to reduce the weight of the first body 414 and further facilitate the formation of the first body 414 as described further herein. The cavities 430 are positioned within the first body 414 according to the stress load applied to the first body 414 while in use, so that such placement of the cavities 430 does not impede the structural integrity and strength of the first body 414 or the mounting insert 402 overall. For example, the material thickness of the first body 414 is generally concentrated around the hexagon-shaped opening 422 and the pilot holes 428 to support the primary loading of the refrigeration unit upon the mounting bolt 406 (FIG. 4) and loading of the cover plate 406 on the cover plate screw 412 (FIG. 4).

Now referring to FIG. 6, the second body 416 defines a second through hole 432 to receive a length of the threading 424 (FIG. 4) and/or shank 426 (FIG. 4) of the mounting bolt 406 extending beyond the first body 414 so that a portion of the threading 424 and/or shank 426 of the mounting bolt extends beyond the opposite side of the second body 416 as shown in FIG. 4 and described further herein. The second body 416 further defines cavities 434 similar to cavities 430 described above in relation to the first body 414, wherein the cavities 434 are positioned according to the load applied to the second body 416 so that the cavities 434 do not impede the structural integrity of the second body 416 and sufficiently support the mounting bolt 406 (FIG. 4).

When mounting bolt 406 is received through holes 420, 432, the first body 414 and the second body 416 are coupled to form mounting insert 402 as shown in FIG. 7; however, first and second bodies 414, 416 are separable from each other at least prior to installation within nose 170. In various embodiments, first and second bodies 414, 416 may be formed as a single or integral component. One of the first body 414 and the second body 416 may include a boss with a corresponding groove defined in the other of first body 414 and the second body 416 to ensure proper alignment of the through hole 420 and the second through hole 432 (FIG. 6) so that the mounting bolt 406 (FIG. 4) can be properly positioned without obstruction. In other embodiments, the first body 414 and the second body 416 may be coupled by other means, such as adhesive, mechanical fasteners, and other coupling techniques generally known in the art. Each of the first body 414 and the second body 416 are generally cylindrical in shape for ease of installation and to maintain the structural integrity of the mounting insert 402 when assembled to support the primary loading of the mounting bolt 406 as described further herein. However, the first body 414 and the second body 416 may be manufactured into other shapes including, for example, a block shape or otherwise edged shape, or an oblong shape; however, the cylindrical shape of the first body 414 and the second body 416 allow for corresponding round openings in the nose 170, as described further herein, that can be easily cut using a hole saw.

As illustrated, the first body 414 and the second body 416 are manufactured separately via injection molding, allowing for ease of creation of the cavities 430, 434 (FIG. 6), through holes 420, 432 (FIG. 6), pilot holes 428, hexagon-shaped opening 422, and the general shape and size of each of the first body 414 and second body 416. The cavities 430, 434 (FIG. 6) further facilitate quicker and easier manufacturing by allowing mold inserts for the resin to cool and cure during the molding manufacturing process. The stacked arrangement of the mounting insert 402 following the separate manufacture of the first body 414 and the second body 416 allows the mounting insert 402 to better adapt to and carry the compressive load of the refrigeration unit when mounted to nose 170 and further provides some flexibility in the size of the overall mounting insert 402.

For example, the first body 414 has a first thickness 436 that is generally greater than a second thickness 438 of the second body 416. When in the stacked configuration, the first body 414 and the second body 416 create an overall thickness "T" (e.g., about 4 inches) that generally corresponds with the thickness of a standard nose 170 (FIG. 1) of a cargo body 130 (FIG. 1) as described further herein. However, in some embodiments, the nose wall of the cargo body may be of a different size, due to, for example, the overall size of the cargo body 130 or the size of the overall cargo vehicle 100. In such embodiments, the thickness 436 of the first body 414 may be sized to generally correspond with the thickness of such a nose wall. While the embodiments discussed herein generally describe a stacked configuration of the first body 414 and the second body 416 to create a mounting insert 402, the first body 414 may be used alone to carry out the functions described as relating to mounting insert 402.

The two-piece construction of the mounting insert 402 by separate injection molding of the first body 414 and the second body 416 allows for the stacked configuration which facilitates the flexible mounting insert size and handle of compressive load as described above. Additionally, the two-piece construction of the mounting insert 402 allows for a quicker, easier, and more cost-effective manufacturing process and the creation of a mounting insert with the complex geometry illustrated to support the structural integrity and thermal performance of the mounting insert while further maintaining a lightweight and reproducible overall structure. However, in other embodiments, the mounting insert 402 may be manufactured using single-piece construction. Additionally, either two-piece or single-piece construction of the mounting insert 402 may be used with other manufacturing methods, including cast molding, additive manufacturing, carving, or other manufacturing processes known in the art. While the mounting insert 402 is described as being formed of a polymer, such as a nylon resin, it is further understood that the mounting insert 402 may be formed of other thermally insulating materials, including other polymers, rigid foams, or any other insulating material capable of being formed in the manner described herein.

4. Installation of Mounting Insert within Cargo Body Nose

Figure 8:
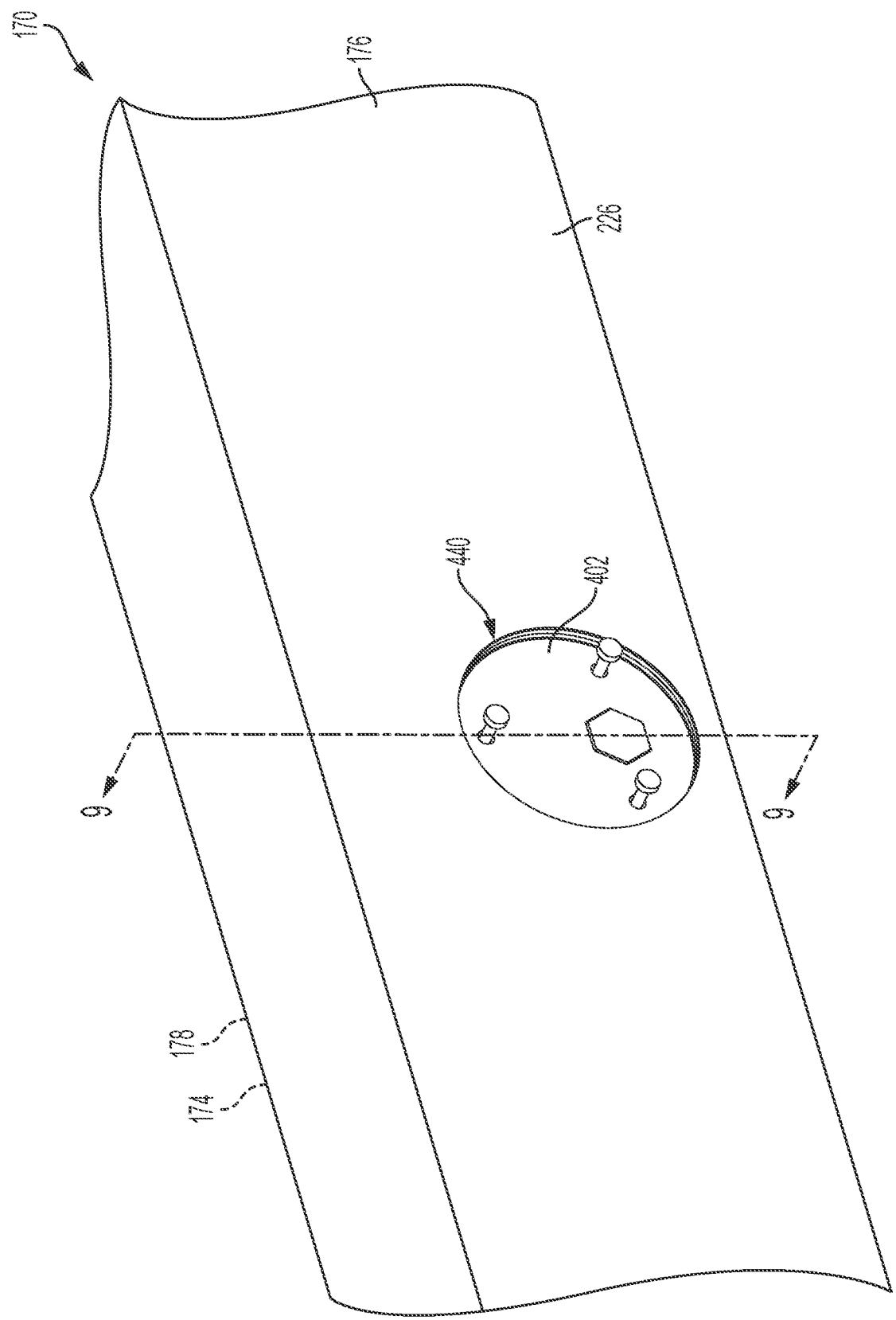
FIG. 8 is a perspective view of the mounting insert of FIG. 7 installed within a composite beam of the nose of the cargo body.
Figure 9:
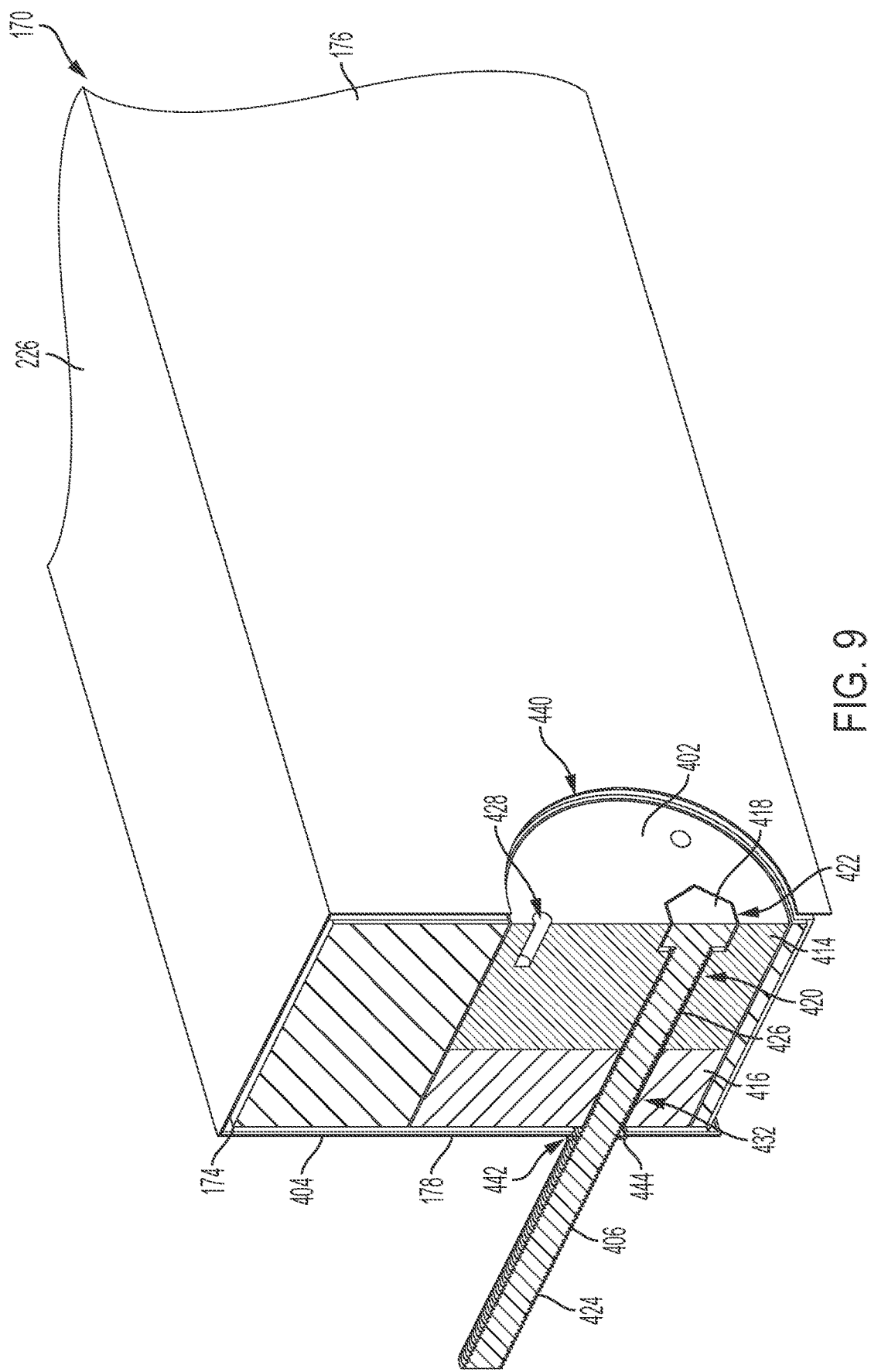
FIG. 9 is a cross-sectional view of the mounting insert of FIG. 8, taken along 9-9 of FIG. 8.

Referring to FIGS. 8-9, the mounting insert 402 installed within the composite beam 226 is illustrated. As shown, a hole 440 generally the size and shape of the mounting insert 402 is cut into the composite beam 226 from the inner surface 176 of the nose 170. As shown specifically in FIGS. 4 and 9, the hole 440 extends through the corresponding composite beam 226 and/or the general thickness of the nose 170 but does not extend through the outer laminate layer 174 of the outer surface 178 of the nose 170. The mounting insert 402 is pushed into hole 440. Various tooling configured for mounting insert 402 may be used to place the mounting insert 402 to facilitate precise placement in relation to the other mounting inserts (see, e.g., FIG. 3). Using through holes 420, 432 (FIG. 6) as a guide, a bolt aperture 442 is drilled through the support plate 404 embedded within the outer laminate layer 174 of the nose 170 within the mounting insert 402 to receive the mounting bolt 406 as described further herein. In other words, the mounting insert 402 guides placement of the bolt aperture 442 to facilitate precise placement of the mounting bolt 406.

Once the mounting insert 402 is pushed into the hole 440 of the composite beam 226, it becomes embedded within the nose 170 via compressive force. The inner foam core 204 (FIG. 2) of the composite beam 226 springs back to form an interference fit with the mounting insert 402, and the generally cylindrical shape of the mounting insert 402 strengthens such interference coupling by facilitating a substantially equal compressive load around the circumference of the mounting insert 402. The first body 414 (FIG. 5) of the mounting insert 402 thereby becomes stepped within or substantially flush with the inner surface 176 of the nose 170.

The through holes 420, 432 of the mounting insert 402 are aligned with the bolt aperture 442 to facilitate unobstructed insertion of the mounting bolt 406. The mounting bolt 406 is inserted within through holes 420, 432 and bolt aperture 442 so that the hexagon-shaped opening 422 receives the head 418 of the mounting bolt 406 and the threading 424 of the mounting bolt 406 protrudes beyond the outer laminate layer 174 of the nose 170 to receive a nut (not shown). As arranged, the head 418 of the mounting bolt 406 does not protrude past the inner surface 176 of the nose wall. Because the mounting insert 402 and corresponding hole 440 does not extend into or beyond the outer laminate layer 174 of the nose 170, the only port of entry from the outer surface 178 of the nose 170 to the inner surface 176 of the nose 170 lays along the path of the mounting bolt 406. As such, a rubber gasket 444 may be placed against the outer surface 178 of the nose 170 around the mounting bolt 406 and clamped into placed by an existing flange of the refrigeration unit upon mounting of the refrigeration unit and tightening of the corresponding mounting bolt 406 to stop leakage of air and water/fluid along this path.

Figure 10:
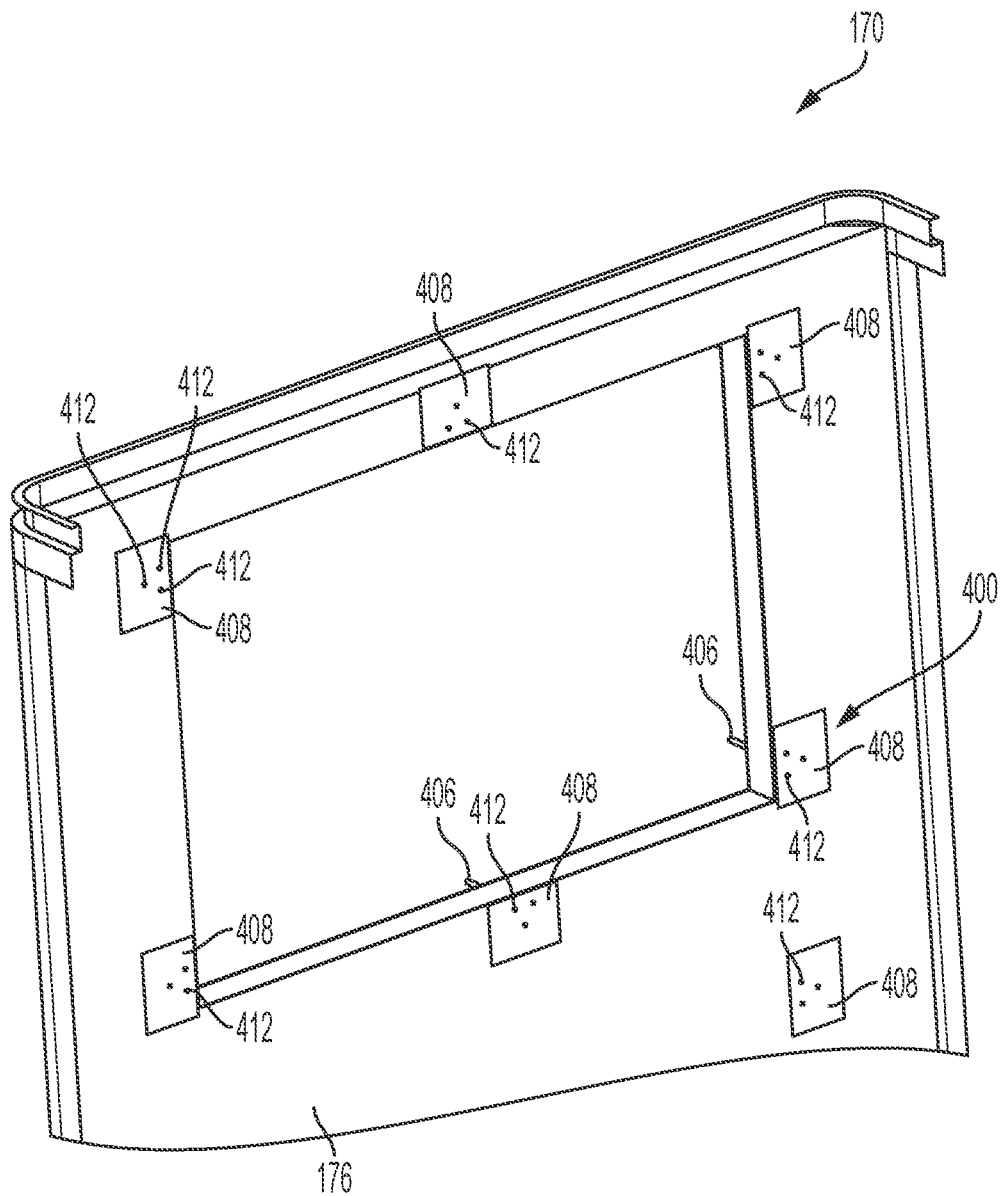
FIG. 10 is a partial perspective view of the inner surface of the nose of the cargo vehicle with the plurality of mounting units installed.

Referring briefly to FIG. 4, the insulation gasket 410 is positioned over the mounting insert 402 and corresponding hole 440. The insulation gasket 410 serves a first purpose to hide the mounting bolt 406 within the nose 170 and serves to further inhibit heat transfer from the bolt head 418 to the inside of the cargo vehicle, as well as inhibiting fluid and air flow between the outer surface 178 of the nose 170 and the inner surface 176 of the nose 170. Referring additionally to FIG. 10, the cover plate 408 is positioned over the insulation gasket 410 so that the cover plate 408 is insulated from the mounting bolt 406. The cover plate 408 is permanently bonded to the inner surface 176 of the nose wall using, for example, adhesive. In other words, the cover plate 408 is illustratively larger than the hole 440 for the mounting insert 402 so that the cover plate 408 can be bonded directly to the nose 170. The cover plate includes apertures that generally align with the pilot holes 428 (FIG. 9) of the mounting insert 402. Screws 412 are drilled through the cover plate apertures and into the pilot holes 428 (FIG. 9) of the mounting insert 402 to further secure the cover plate 408 to the mounting insert 402 (FIG. 9) while the cover plate 408 further serves as loading support for the cover plate screws 412 and mounting insert 402 as described further herein.

As discussed above in Section 3, the mounting insert 402 is illustratively formed of a high-performance resin (e.g., nylon resin), having a strength to withstand at least about 13,000 psi, having an elastic modulus of about 250,000 psi, and having about 6% to about 10% elongation at break. While other materials may be used as described above, the mounting insert is generally formed of a material that can withstand such loading to maintain structural integrity and hold the refrigeration unit in place in instances of movement and potentially abrupt, sudden, intense movement or termination of movement, such as in the case of a rapid stop. The arrangement of components of the mounting units 400 as described herein further facilitate such safety and integrity of the mounting of a refrigeration unit. For example, the use of the mounting insert 402 allows the head of the mounting bolt to rest against the insert itself, which is embedded within the structure of the composite material as a result of the foam core interference fit. Furthermore, the mounting insert 402 directly rests against the inside surface of the outer laminate layer 174 of the outside surface 178 of the nose 170. Such arrangement provides a stronger, more secure loading on the mounting bolt with installation of the refrigeration unit that conventional arrangements that require the head of the bolt to rest against the inner surface of the nose. Additionally, since the head of the mounting bolt is embedded within the wall itself, the head of the mounting bolt does not serve as a thermal short between the exterior of the nose and the interior of the nose, with the insulation gasket serving as an additional layer of protection.

The bonding of each cover plate to the inner surface of the nose in addition to the use of cover plate screws further secures the placement of the corresponding mounting unit by creating a load path from the heads of the cover plate screws to the cover plate itself, and further to the inner surface 176 of the nose 170. In other words, in the case of an abrupt stop, the cover plate screws pull against the cover plate, which is bonded to the nose. For the entirety of the system to be pulled through the nose, the cover plate would be required to disbond from the inner surface of the nose and be compressed and pulled through the smaller hole of the mounting insert, which would require a much stronger force than would be required for the cover plate screws to be pulled through the larger mounting insert hole.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A mounting unit for supporting a refrigeration unit on a cargo body, comprising:
   a first body including a first opening;
   a second body including a second opening corresponding with the first opening; and
   a mounting bolt configured to be received within the first opening and the second opening;
   wherein a length of the mounting bolt extends beyond both of the first body and the second body when the mounting bolt is received within the first opening and the second opening;
   wherein the first body and the second body are configured to be supported within a nose of the cargo body; and
   wherein an entirety of a longitudinal length of the first body and the second body is positioned entirely within the thickness of the nose.

2. The mounting unit of claim 1, wherein the first body defines a plurality of cavities.

3. The mounting unit of claim 1, wherein the second body defines a plurality of cavities.

4. The mounting unit of claim 1, wherein the first opening is a stepped opening within a third opening, the third opening configured to receive a head of the mounting bolt.

5. The mounting unit of claim 4, wherein the third opening is hexagon-shaped.

6. The mounting unit of claim 1, the first body including at least one pilot hole for receiving a mechanical fastener.

7. The mounting unit of claim 6, further comprising an insulation gasket to cover a surface of the first body.

8. The mounting unit of claim 1, further comprising a gasket positioned around the mounting bolt.

9. The mounting unit of claim 1, wherein the first body and the second body abut one another.

10. The mounting unit of claim 1, wherein at least one of the first body and the second body is positioned entirely within a thickness of the nose.

11. The mounting unit of claim 1, wherein a front surface of the first body and a rear surface of the second body are longitudinally intermediate a front surface and a rear surface of the nose.

12. The mounting unit of claim 1, wherein a front surface of the first body is rearward of a front surface of the nose.

13. A mounting unit for supporting a refrigeration unit on a cargo body, comprising:
   a first body including a first opening and at least one pilot hole for receiving a mechanical fastener;
   a second body including a second opening corresponding with the first opening; and
   a mounting bolt configured to be received within the first opening and the second opening;
   an insulation gasket to cover a surface of the first body; and
   a cover plate to cover the insulation gasket, the cover plate configured to couple to the first body with the mechanical fastener
   wherein a length of the mounting bolt extends beyond both of the first body and the second body when the mounting bolt is received within the first opening and the second opening; and
   wherein the first body and the second body are configured to be supported within a nose of the cargo body.

14. A nose of a cargo body for mounting a large component, the nose formed of a composite material having a foam core, an inner surface, and an outer surface having an outer laminate layer, the nose comprising:
   a support plate embedded within the outer laminate layer, the support plate defining a bolt aperture;
   a mounting insert positioned within a hole defined by the composite material, the hole extending from the inner surface of the nose through the foam core so that the mounting insert does not extend beyond the inner surface of the nose, the mounting insert comprising a mounting bolt positioned within a through hole of the mounting insert so that a portion of the mounting bolt extends through the bolt aperture of the support plate and beyond the outer surface of the nose; and
   a cover plate fastened to the mounting insert with a mechanical fastener, wherein the mechanical fastener is spaced apart from the mounting bolt.

15. A nose of a cargo body for mounting a large component, the nose formed of a composite material having a foam core, an inner surface, and an outer surface having an outer laminate layer, the nose comprising:
   a support plate embedded within the outer laminate layer, the support plate defining a bolt aperture;
   a mounting insert positioned within a hole defined by the composite material, the hole extending from the inner surface of the nose through the foam core so that the mounting insert does not extend beyond the inner surface of the nose, the mounting insert comprising a mounting bolt positioned within a through hole of the mounting insert so that a portion of the mounting bolt extends through the bolt aperture of the support plate and beyond the outer surface of the nose; and
   a cover plate fastened to the mounting insert with a mechanical fastener, the cover plate permanently bonded to the inner surface of the nose.

16. A nose of a cargo body for mounting a large component, the nose formed of a composite material having a foam core, an inner surface, and an outer surface having an outer laminate layer, the nose comprising:
   a support plate embedded within the outer laminate layer, the support plate defining a bolt aperture;
   a mounting insert positioned within a hole defined by the composite material, the hole extending from the inner surface of the nose through the foam core so that the mounting insert does not extend beyond the inner surface of the nose, the mounting insert comprising a mounting bolt positioned within a through hole of the mounting insert so that a portion of the mounting bolt extends through the bolt aperture of the support plate and beyond the outer surface of the nose; and a cover plate fastened to the mounting insert with a mechanical fastener; and an insulation gasket disposed between the mounting insert and the cover plate.

17. The nose of claim 14, further comprising a plurality of mounting inserts.

18. A nose of a cargo body for mounting a large component, the nose formed of a composite material having a foam core, an inner surface, and an outer surface having an outer laminate layer, the nose comprising:
   a support plate embedded within the outer laminate layer, the support plate defining a bolt aperture;
   a mounting insert positioned within a hole defined by the composite material, the hole extending from the inner surface of the nose through the foam core so that the mounting insert does not extend beyond the inner surface of the nose, the mounting insert comprising a mounting bolt positioned within a through hole of the mounting insert so that a portion of the mounting bolt extends through the bolt aperture of the support plate and beyond the outer surface of the nose; and
   a cover plate fastened to the mounting insert with a mechanical fastener;
   wherein the mounting bolt does not extend beyond the inner surface of the nose.

19. A nose of a cargo body for mounting a large component, the nose formed of a composite material having a foam core, an inner surface, and an outer surface having an outer laminate layer, the nose comprising:
   a support plate embedded within the outer laminate layer, the support plate defining a bolt aperture;
   a mounting insert comprised of a first body and a second body, the mounting insert positioned within a hole defined by the composite material, the hole extending from the inner surface of the nose through the foam core so that the mounting insert does not extend beyond the inner surface of the nose, the mounting insert comprising a mounting bolt positioned within a through hole of the mounting insert so that a portion of the mounting bolt extends through the bolt aperture of the support plate and beyond the outer surface of the nose; and
   a cover plate fastened to the mounting insert with a mechanical fastener.

20. A method of manufacturing a wall of a cargo body having embedded inserts, the method comprising:
   assembling a plurality of composite beams or composite panels to form the wall;
   forming a hole within an inner surface of the wall, the hole extending from an inner surface of the wall to an outer surface of the wall without penetrating the outer surface;
   inserting a mounting insert within the hole;
   forming a bolt aperture within an outer surface of the wall;
   inserting a mounting bolt through the mounting insert so that the mounting bolt extends through the bolt aperture; and
   coupling a cover plate to at least one of the mounting insert or the inner surface of the wall, the cover plate covering the mounting insert.

21. The method of claim 20, the step of coupling the cover plate further including the step of permanently bonding the cover plate to the inner surface of the wall.

22. The method of claim 21, the step of coupling the cover plate further including the step of coupling the cover plate to the mounting insert with a mechanical fastener.

23. The method of claim 20, wherein the step of inserting a mounting insert within the hole includes the steps of:
   inserting a first body within the hole, the first body including a first through hole configured to align with the bolt aperture; and
   inserting a second body within the hole, the second body including a second through hole configured to align with the first through hole and the bolt aperture.

24. The method of claim 20, wherein the mounting bolt extends past only one surface of the mounting insert when inserted within the mounting insert.

25. The method of claim 20, wherein the step of forming a bolt aperture includes using the mounting insert as a guide to form the bolt aperture.

* * * * *